March 14, 1950     J. E. MORRIS     2,500,425
STAIR CLIMBING PRACTICE ASSEMBLY
Filed April 22, 1946
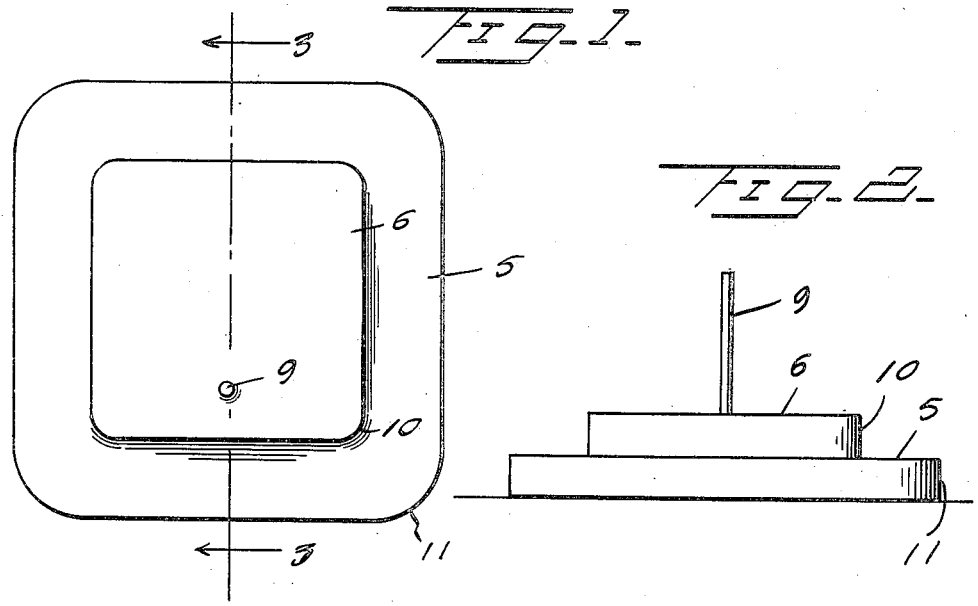
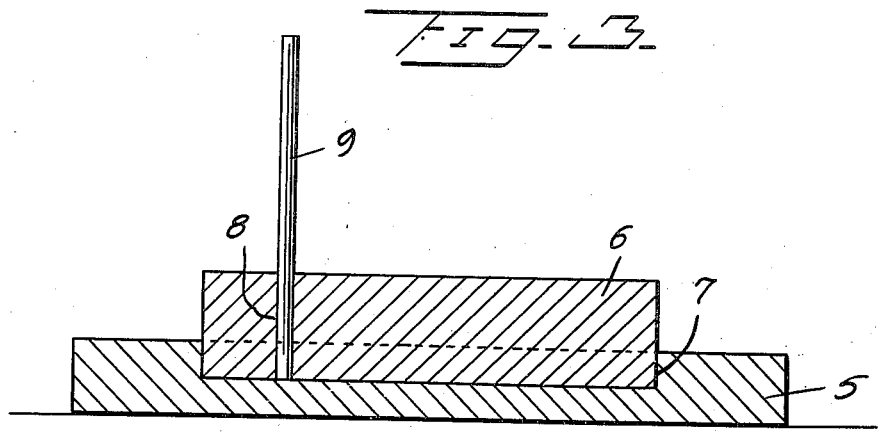
Inventor
John E. Morris
By Randolph & Beavers
Attorneys Patented Mar. 14, 1950

2,500,425

UNITED STATES PATENT OFFICE 2,500,425

STAIR CLIMBING PRACTICE ASSEMBLY

John E. Morris, Elizabethtown, Ky.

Application April 22, 1946, Serial No. 664,009

1 Claim. (Cl. 35—29)

The present invention appertains to educational appliances, and more particularly to a practice structure for small children to facilitate their learning to climb stairs readily and safely.

An important object of the invention is to provide a stepped structure including a hand grasping pole, which in use will facilitate children in learning to climb stairs and at the same time offer a platform, upon which the child may play.

Another important object of the invention is to provide an elevated structure onto which small children may safely climb and incidentally become acquainted with the actions necessary in climbing steps, which may prove valuable when the child begins the natural urge to climb steep stairways.

A further object of the invention is to provide a device of the character stated wherein the parts may be separated to permit storage of the device in a limited space.

These and various other important objects and advantages of the invention will become apparent to the reader of the following description.

In the drawing—

Figure 1 is a top plan view of the device;

Figure 2 is a side elevational view;

Figure 3 is an enlarged cross sectional view taken on line 3—3 of Figure 1.

Referring to the drawing, numeral 5 denotes a base upon which a riser 6 is seated. The base 5 and riser 6 may be of rectangular shape, ovate, round or of any other desired configuration. It is desirable that the base 5 have a sunken area or well 7 in which the lower portion of the riser 6 seats, in order that there can be no shifting of the riser 6 on the base 5. However, various securing means between the riser and the base 5 may be adopted, but from the standpoint of simplicity, it is thought that the form represented in Figure 3 is practical and capable of being inexpensively manufactured.

The riser 6 has an opening 8 vertically therethrough and adjacent one edge thereof to receive the lower portion of an upstanding hand grasping post 9, which can be removed conveniently from the riser 6, when it is desired that the assembly be stored away, as under a bed.

It is preferable, if the base 5 and riser 6 are of rectangular shape, that the corners be rounded off as at 10 and 11, as clearly shown in Figure 1.

In the use of the assembly, it can be seen that the small child takes a step onto the base 5, a point adjacent the pole 9 and in this act grasps the pole 9, which helps him up the first step, after which he can take the second step onto the riser 6.

Initially, the child will probably crawl up the two steps, but will eventually find convenience in grasping the pole 9 to assist him up these two steps while in an upright position.

The base 5 and riser 6 may be of wood or any other desirable material and may be of any practical size.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

An educational device for teaching children to climb stairs, comprising a rectangular base block of substantial thickness forming a first riser and step of a training staircase and having a centered recess on the upper face thereof, a second smaller rectangular block of similar thickness forming a second riser and step of said staircase and resting in said recess and a hand grasping pole mounted in the second block, close to one edge thereof.

JOHN E. MORRIS.

REFERENCES CITED

The following references are of record in the file of this patent:

UNITED STATES PATENTS

| Number | Name | Date |
|---|---|---|
| 275,329 | Crandall | Apr. 3, 1883 |
| 489,669 | Carpenter | Jan. 10, 1893 |
| 821,391 | Wiltse | May 22, 1906 |
| 948,795 | Rosenthal | Feb. 8, 1910 |
| 1,472,536 | Thomson | Oct. 30, 1923 |
| 1,839,711 | Sommer | Jan. 5, 1932 |